United States Patent
Hao et al.

(10) Patent No.: US 9,396,482 B2
(45) Date of Patent: Jul. 19, 2016

(54) DATA USAGE PLAN ASSOCIATED WITH USER DEVICE

(75) Inventors: Jack Jianxiu Hao, Lexington, MA (US); John F. Gallagher, Hopewell, NJ (US); Michael Oliver, Wayne, NJ (US); Lonnie Hiroshi Katai, Murphy, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 684 days.

(21) Appl. No.: 13/221,955

(22) Filed: Aug. 31, 2011

(65) Prior Publication Data

US 2013/0054378 A1 Feb. 28, 2013

(51) Int. Cl.
*G06Q 20/00* (2012.01)
*G06Q 30/02* (2012.01)
*G06Q 30/04* (2012.01)

(52) U.S. Cl.
CPC ............ *G06Q 30/0241* (2013.01); *G06Q 30/04* (2013.01)

(58) Field of Classification Search
USPC .......................................................... 705/52
See application file for complete search history.

(56) References Cited

U.S. PATENT DOCUMENTS

| | | | | |
|---|---|---|---|---|
| 7,184,977 B1* | 2/2007 | Crim | ...................... | G06Q 40/00 705/34 |
| 2005/0286479 A1* | 12/2005 | Spencer | ............... | H04B 7/2606 370/338 |
| 2007/0192409 A1* | 8/2007 | Kleinstern | ............. | G06Q 10/10 709/203 |
| 2008/0120389 A1* | 5/2008 | Bassali | ..................... | G06F 5/14 709/207 |
| 2009/0276771 A1* | 11/2009 | Nickolov | ............... | G06F 9/4856 717/177 |
| 2010/0008500 A1* | 1/2010 | Lisanke | .................. | G06F 21/10 380/201 |
| 2010/0223096 A1* | 9/2010 | Bosan | .................... | G06Q 30/02 705/14.64 |
| 2011/0258049 A1* | 10/2011 | Ramer | ............. | G06F 17/30867 705/14.66 |
| 2011/0275344 A1* | 11/2011 | Momtahan | ............... | H04L 12/14 455/405 |
| 2012/0198046 A1* | 8/2012 | Shah | ...................... | G06Q 30/04 709/224 |
| 2012/0250586 A1* | 10/2012 | Ahmavaara | ......... | H04L 41/0896 370/259 |

\* cited by examiner

*Primary Examiner* — Dante Ravetti

(57) ABSTRACT

A method includes providing identifying application information associated with a user device in a network. The application information is information associated with at least one application running on the at least one user device. The method may further include identifying data usage information associated with the user device. The data usage information includes information associated with data used by the user device. In addition, the method may include associating the application information and the data usage information to determine application data usage for the user device. The method may also include identifying a data usage plan associated with the user device, and applying the data usage plan in the network based on the application data usage.

20 Claims, 6 Drawing Sheets

| TIME 152 | USER ID 154 | APP ID 156 | ACTION ID 158 | CONTENT ID 160 | LOCATION 162 |
|---|---|---|---|---|---|
| 2011/06/14/19:15:20 | 1122 | 123 | BROWSE | MOVIE LISTINGS | WASH, DC |
| 2011/06/14/20:15:00 | 1122 | 123 | BUY | HERO MOVIE | WASH, DC |
| 2011/06/14/21:16:20 | 1122 | 123 | PLAY | HERO MOVIE | WASH, DC |
| 2011/06/14/23:15:20 | 1122 | 123 | RENT | HERO MOVIE | WASH, DC |

| TIME 152 | USER ID 154 | APP ID 156 | SOURCE IP 172 | SOURCE PORT 174 | DATA CALL TYPE 176 | USAGE 178 | BILL CODE 180 |
|---|---|---|---|---|---|---|---|
| 2011/06/14/19:15:20 | 1122 | 123 | 132.197.76.55 | 80 | HTTP | 750 | 123 |
| 2011/06/14/20:15:00 | 1122 | 123 | 132.197.76.56 | 8081 | HTTPS | 500 | 123 |
| 2011/06/14/21:16:20 | 1122 | 123 | 132.197.76.55 | 8080 | RTSP | 56000 | 1122 |
| 2011/06/14/23:15:20 | 1122 | 123 | 132.197.76.55 | 80 | HTTP | 750 | 123 |

FIG. 1C

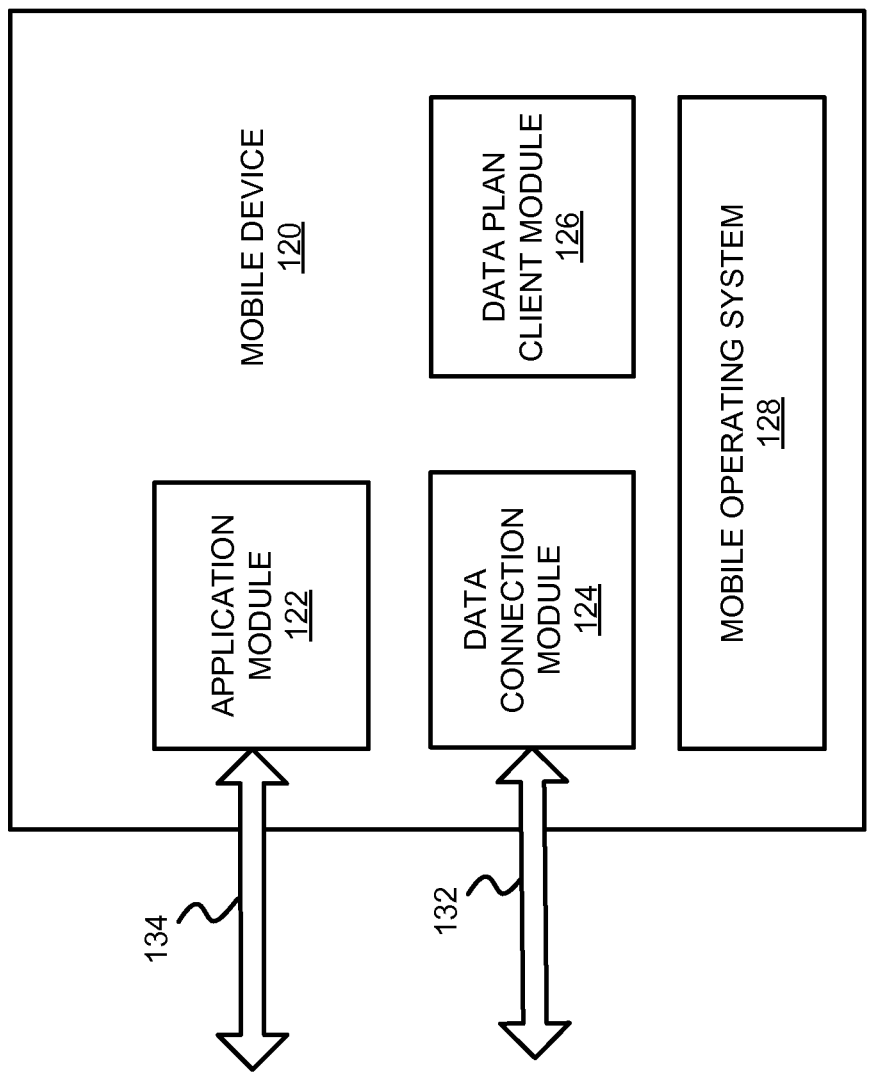

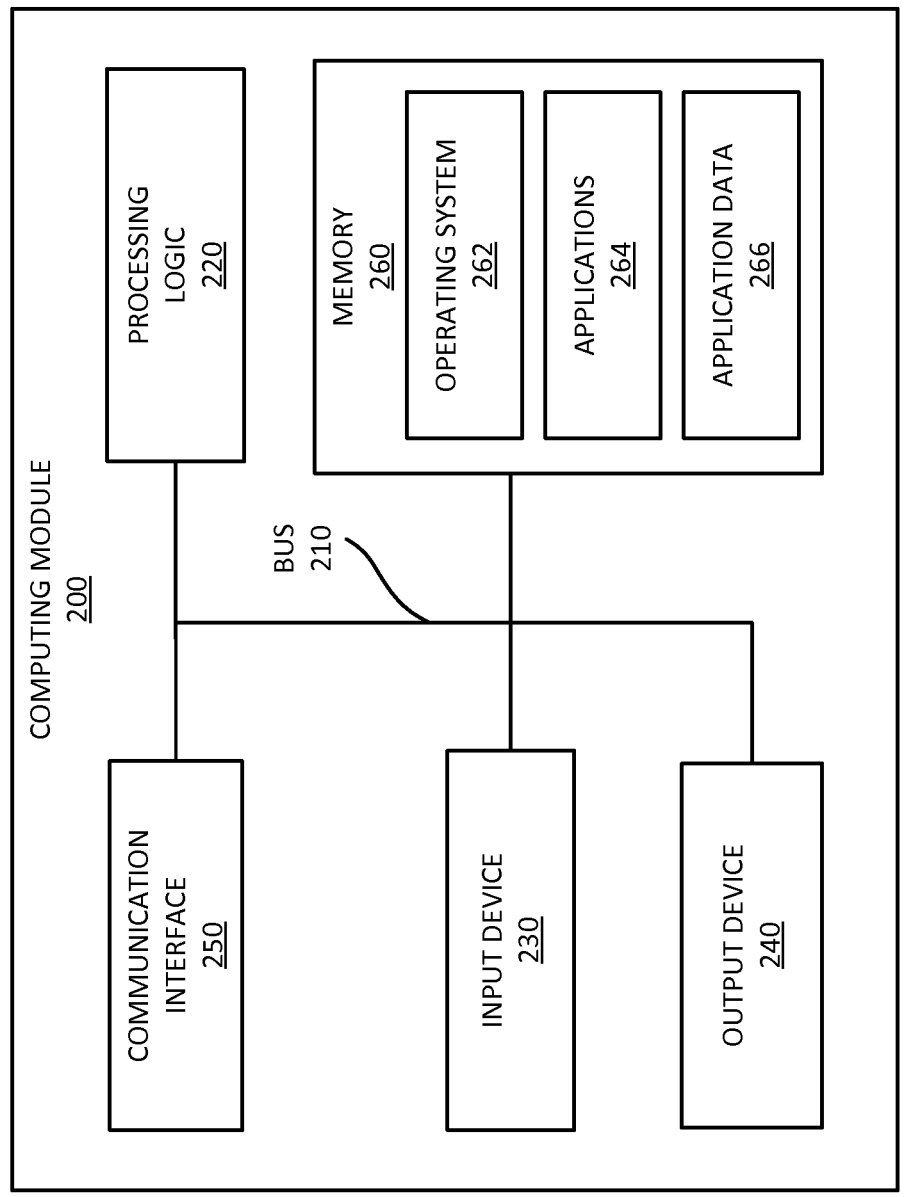

DATA USAGE PLAN ASSOCIATED WITH USER DEVICE

BACKGROUND INFORMATION

Telecommunications providers currently provide multiple services, including cable television, Internet, and mobile telephone services, to their customers. In some instances, individual customers may receive combinations of these multiple services from a single telecommunications provider. The telecommunications providers manage relationships with their customers using customer accounts that include the multiple services.

BRIEF DESCRIPTION OF THE DRAWINGS

FIG. 1B is an exemplary table of application information associated with a user device;

FIG. 1C is an exemplary table of data usage information associated with a user device;

FIG. 1D is a functional block diagram of an exemplary user device;

FIG. 2 illustrates an exemplary configuration of one or more of the components of FIG. 1A.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for applying a data usage plan associated with a user device in a network. Consistent with the embodiments described herein, a telecommunications provider may provide data associated with a particular application to a user device using a data usage plan that includes one or more billing accounts, predetermined categories, and user devices.

Figure 1A:
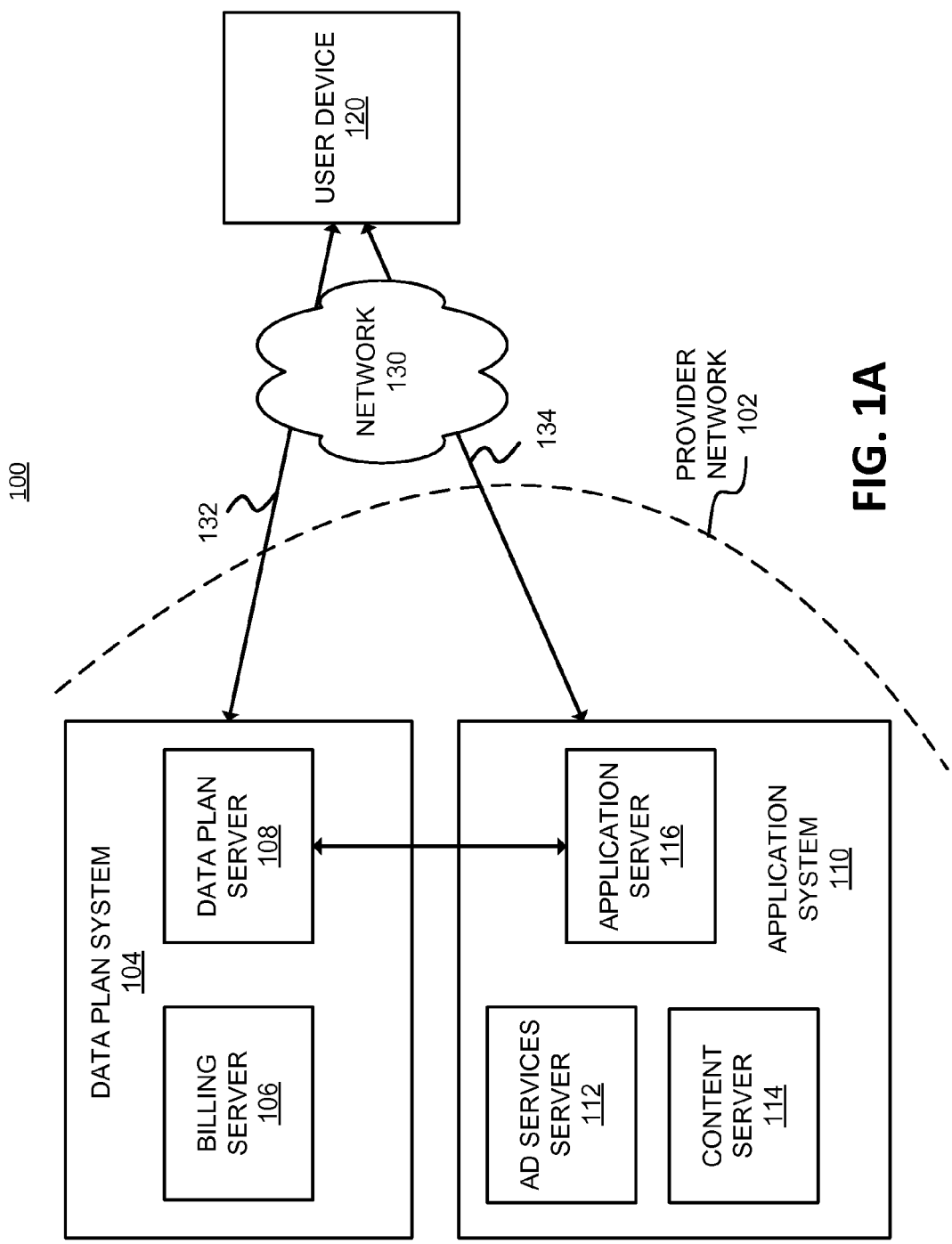
FIG. 1A illustrates an exemplary network in which systems and methods described herein may be implemented.

FIG. 1A is a diagram of an exemplary network 100 in which systems and/or methods described herein may be implemented. As illustrated, network 100 may include a provider network 102 and a user device 120. Provider network 102 may include a data plan system 104, and an application system 110. Provider network 102 and user device 120 may be interconnected by network 130. Components of network 100 may be interconnected via wired and/or wireless connections. The configuration of components of network 100 illustrated in FIG. 1A is for illustrative purposes only. Although not shown, provider network 102 may also include other components of a provider network for a telecommunications service provider such as customer information servers, security devices, etc., and may manage the customer-provider relationship for a plurality of customers and user devices 120. Other configurations may be implemented. Therefore, network 100 may include additional, fewer and/or different components than those depicted in FIG. 1A. Also, in some instances, one or more of the components of network 100 may perform one or more functions described as being performed by another one or more of the components of network 100.

Network 130 may include one or more wired and/or wireless networks that are capable of receiving and transmitting data, voice and/or video signals, including multimedia signals that include voice, data and video information. Network 130 may include one or more wireless/mobile networks and/or a public switched telephone network (PSTN). Network 130 may include one or more packet switched networks, such as an Internet protocol (IP) based network, a local area network (LAN), a wide area network (WAN), a personal area network (PAN), an intranet, the Internet, or another type of network that is capable of transmitting data. Network 130 may include one or more high-speed data networks, such as a very high performance backbone network services (vBNS) network.

Application system 110 may include an ad services server 112, a content server 114, and an application server 116. Each of the servers (ad services server 112, content server 114, and application server 116) may include one or more distribution devices, and memory/storage devices. Application system 110 may also include additional servers and/or memory/storage devices.

Application server 116 may host applications, such as streaming video, Internet service, and/or other telecommunications services that may be accessed by devices, such as user device 120. Application server 116 may communicate 134 with user device 120 and receive requests for particular applications, and/or content. The content may be provided by content server 114 and may include movies, sports programs, music programs, live video or television, video games, etc. Application server 116 may also provide advertisements from ad services server 112 in conjunction with requested/selected content from content server 114. In some embodiments, the advertisements may be provided concurrently with the content (e.g., "pop-ups", banners, etc.) and/or at scheduled breaks in the content. Application server 116 may provide particular content to user device 120 in response to a request from user device 120 with corresponding identification of user device 120 and authorizations for the content using the particular application.

Application server 116 may identify application information associated with user device 120. The application information may be information associated with applications that may be running on user device 120. According to an example, application server 116 identifies application information associated with user device 120 that may be organized based on particular categories and stored in a table, for instance an application information table 150 as shown in FIG. 1B. For example, application server 116 may receive application information in table 150 from user device 120 and store the application information in a memory/storage device (not shown). Data fields included in application information table 150 may include application information, such as time 152, user identification (ID) 154, application (App) ID 156, action ID 158, content ID 160, and location 162. Time 152 indicates a time that a data connection is initiated for user device 120 or a particular application on user device 120. User ID 154 is a customer ID of a user associated with user device 120, for instance an individual "signed on" to a particular application or a customer associated with user device 120. App ID 156 is an application ID for applications registered to data plan server 108 (illustrated in FIG. 1B as 123, for instance a streaming video application). App ID 156 may uniquely identify each application. Action ID 158 indicates a particular action associated with an application (e.g., browse, buy, play, rent, download, search, etc.). Content ID 160 identifies content received by user device 120, such as a movie or a menu of movie choices, (illustrated in FIG. 1B as a movie title, in this instance "Hero Movie" and general content information, in this instance "movie listings", respectively). Location 162 indicates a location of user device 120 and may be a city, zip code, communication tower or substantially precise longitude and latitude of user device 120.

Each application (and corresponding actions, content and advertisements) may consume varying amounts of data. For instance, application server 116 may output a video streaming application that includes a movie from content server 114 and advertisements from ad services server 112 and uses a particular amount of data measured, for instance, in bytes and/or megabytes (MBs). Application server 116 may provide the applications and corresponding data to user device 120 based on an application plan (i.e., a policy regarding the provision of applications to user device 120) and/or content plan (i.e., a policy regarding the provision of content to user device 120) associated with a user or owner of user device 110 in conjunction with a data usage plan administered through data plan system 104 as described below. The application plan, the content plan, and the data usage plan may include one or more associated billing accounts for applications, content, and/or data usage. Application server 116 may provide applications, and corresponding data, to user device 120 based on interactions with data plan system 104. For instance, application server 116 may receive authorization for data usage associated with content and applications provided to user device 120 from data plan server 108 of data plan system 104.

Data plan system 104 may include a billing server 106, and a data plan server 108. Each of the servers (billing server 106, and data plan server 108) may include one or more distribution devices, and memory/storage devices. Data plan system 104 may also include additional servers and/or memory/storage devices.

Data plan server 108 may administer a data usage plan associated with user device 120. The data usage plan associated with user device 120 may be identified with a particular device and/or a particular user of user device 120 (e.g., a user that signs on to a particular application on user device 120 with particular user identification). The data usage plan may define a policy of data usage for user device 120 for one or more applications and may include related information, such as billing accounts, billing rates and terms of service. The terms of service may include data speed thresholds, data volume thresholds and error rate thresholds, and provide for advertisements to be inserted into content. The data usage plan may be implemented based on a network 190 that carries data for user device 120. For example, a customer may be able to register user device 120 to one or more of a plurality of networks 130, each network 130 having different (or in some instances none or flat rate) data usage plans (i.e., the data usage plan may cover access to a mobile network while another plan may cover access to an alternative wireless network, such as a Wi-Fi standard network, provided by a same telecommunications provider). Data plan server 108 may administer the data usage plan in conjunction with applications and content received by user device 120 from application server 116.

Data plan server 108 may identify data usage information for data usage from user device 120 that may be organized based on particular categories and stored in a table, for instance a data usage table 170 as shown in FIG. 1C. Data plan server 108 may identify the data usage information by receiving the data usage information from user device 120. Data fields included in data usage table 170 may include data usage information, such as time 152, user ID 154, app ID 156, source Internet Protocol address (IP) 158, source port 160, data call type 162, usage 164 and bill code 166. The data usage information may include some of the same information as the application information received by application server 116 and stored in application information table 150 described above, such as time 152, user ID 154, and app ID 156 (i.e., a same time 152, user ID 154, app ID 156, etc., may be received for an application and corresponding data usage). Source IP 172 indicates a source IP address of the data (for instance, illustrated in FIG. 1C as 132.197.76.55). Source port 174 identifies a source port of an application that is received by user device 120 (illustrated as 80 in FIG. 1C). Data call type 176 indicates a type of data call for the application, such as hypertext transfer protocol (HTTP), HTTP secure (HTTPS), and real time streaming protocol (RTSP), etc. Usage 178 indicates a particular amount of data used by the application, measured, for instance, in bytes, kilobytes (KBs) or MBs. Bill code 180 identifies a billing protocol for the data usage. The billing protocol may indicate a billing rate and/or billing account that may be billed for particular data usage 178. Some data usage 178 may be billable to the user and other data usage 178 may be billable to other entities (for instance an application provider) according to one or more agreements between the user and the telecommunications service provider that may be maintained by the data plan server 108.

Data plan server 108 may match data included in application information table 150 with data included in data usage table 170 to determine data usage 178 associated with particular content, for instance a movie, an advertisement or browsing a movie listing. For example, data plan server 108 may receive the application information from application server 116. Data plan server 108 may match a particular time 152 and user ID 154 (included in both application information table 150 and data usage table 170) with an action ID 158 (identified in application information table 150) and data usage 178 (identified in data usage table 170).

Data plan server 108 may identify a data usage plan associated with user device 120. Data plan server 108 may access and identify the data usage plan associated with user device 120, for instance stored in a memory or storage device (e.g., data plan server 108 may compare an identifier for user device 120 or a user of user device 120 with a database of data storage plans that include associated identifiers for user devices 120 and/or users). Data plan server 108 may apply the data usage plan associated with user device 100 in network 100 to put the policy included in the data usage plan into operation for user device 120.

According to an example, data plan server 108 may determine data usage table 170 in conjunction with billing server 106 based on information received from user device 120. Billing server 106 may receive data usage 178 and associated application information and apply a predetermined policy to billing for particular data usage 178. For example, billing server 106 may receive an indication from data plan server 108 that data usage 178 for a "buy" action is free of charge to consumer (based, for instance on a billing code indicating that the data usage 178 is to be billed to the application provider). Billing server 106 may receive further instructions to charge data usage 178 for the "buy" action to the application provider.

Data plan server 108 may determine available data allocations and billing accounts for applications requested from application server 116 by user device 120. According to an example, for a particular data usage 178, an application with an app ID 156 of 123 may pay for data usage 178 (illustrated as bill code 180 with a code of 123 indicating that the application with an app ID 156 of 123 pays for the data usage). The application provider may be billed at an application provider billing account for data usage 178 that occurs with the application for user device 120. In other instances, the user may pay for data usage 178 using a user billing account (illustrated as bill code 180 with a code of 1122 indicating that the customer with a user ID 154 of 1122 pays for the data usage, in this instance the playing (streaming) of the movie). Billing code 180 may be a default code that indicates that data usage 178 is billable to the consumer at a predetermined default data usage billing rate. The billing account for data usage 178 may be a billing account for a specific user of user device 120. Alternatively, the billing account for data usage 178 may be a billing account for a provider of an application and/or content and the billing account for the provider may be used for multiple user devices 120 and/or users.

Data plan server 108 may administer the data usage plan using information determined by billing server 106 regarding the data usage plan. For instance, data plan server 108 may communicate 132 with user device 120 and receive a data usage request associated with a content request output by user device 120 to provider network 102. According to one implementation, data plan server 108 may identify a data usage plan that corresponds to user device 120. Billing server 106 may determine a billing status for one or more accounts associated with the data usage plan and user device 120. User device 120 may substantially concurrently provide data usage information regarding data usage 178 associated with user device 120. Data plan server 108 may enable data use by application server 16 to provide applications to user device 120 based on the data usage plan.

Data plan server 108 may interact with application server 116 to implement data usage plans with various configurations for different applications, billing accounts and actions. According to an example, data plan server 108 may receive a proposed data usage associated with a particular application from user device 120. Data plan server 108 may determine a billing account and billing rates based on the data usage plan for user device 120, and provide instructions for application server 116 accordingly. Data plan server 108 may authorize the proposed data usage and assign billing for the data usage 178 to an indicated billing account associated with user device 120 in response to a determination that the proposed data usage is allowed in the current instance under the data usage plan.

According to one implementation, data plan server 108 may interact with application server 116 to implement a data usage plan that is included in a subscription service. The subscription service may be a movie service for which the customer pays a periodic fee and receives predefined access to content and data usage 178 that supports the receipt of content and/or applications at user device 120. The terms of data usage 178 may be determined under the data usage plan. For example, the user may subscribe to the subscription service and a movie application associated with the subscription service may indicate that a predetermined free data allocation is to be provided with content received from the subscription service. Data usage 178 under the free data allocation may be billed to the subscription service provider at a first billing rate.

User device 120 may use additional application data and transmit additional application data information including the additional application data usage 178 to data plan server 108. In instances that data plan server 108 determines that data usage 178 exceeds (or is close to exceeding) the threshold provided by the free data allocation, a warning message may be output to user device 120 indicating that subsequent usage may be covered by a default data rate that is directly billable to a user account associated with user device 120 (for instance at a second billing rate). Alternatively, data plan server 108 may stop the application based on the data usage plan at the time that the free data allocation becomes exhausted. Further, the data usage plan may indicate that the user is to be charged at the second billing rate for a predetermined amount of data and at another billing rate after the predetermined amount of data is exhausted (i.e., the user may purchase a limited amount of data at a reduced billing rate). Data usage 178 may be billed to different accounts at different billing rates for different allocations of data based on administrative or business logic that may be used to define the policy in the data usage plan.

According to another implementation, data plan server 108 may interact with application server 116 to distribute data usage 178 across multiple user devices 120, for instance for a single user or a group of users. Data usage 178 for the multiple user devices 120 may be billed to a single account. For example, a user or administrator may have a predetermined allocation of data that may be used by multiple user devices 120, such as one or more tablets, personal digital assistants (PDAs), mobile telephones, etc. In a variation of this implementation, a single user with a single user ID 154 may access applications and content from provider network 102 using multiple user devices 120. In another variation, the single billing account may be associated with an application that is provided to a group of users having different user IDs 154 that identify distinct users associated with different user devices 120. The users may be provided access for a group viewing of particular content and the billing account may be billed at a group rate discount. In this instance, each group member may receive a passcode, and each group member may view the content without additional payment, for instance during a specified time window. The group members may be identified by a billable passcode that may be provided initially to the administrator of the billable account.

According to another implementation, data plan server 108 may interact with application server 116 to implement an advertisement based data usage plan in which advertisers may pay for the data usage and in turn advertisements may be included with content provided to user device 120. The advertisement based data usage plan may be implemented as an independent plan or as an overflow policy/plan for a subscription service, such as the subscription service discussed above. For instance, the advertisement based data usage plan may be implemented when data usage 178 exceeds the predetermined threshold. Application server 116 may provide an advertisement to be associated with particular content, for example, "Hero Movie" may be viewed with advertisements and without additional costs to the consumer for associated data usage 178. Data usage 178 in this instance may be billed to an advertiser billing account.

In some instances, user device 120 may be allowed to view advertisement sponsored content during a predetermined time, such as a period of the day, week, or month. The advertisements offered may be determined using the application information received from user device 120. For instance advertisements may be provided based on user's application data usage determined from the application information and the data usage information. The advertisements may be targeted to user device 120 based on applications and content previously selected by the user, such as advanced games or other movies, etc. Furthermore, location based advertisements may be targeted to the user based on a location 162 of user device 120.

According to one implementation, data plan server 108 may interact with application server 116 to implement a content provider sponsored data usage plan in which a content provider pays for data usage 178 for user device 120 during predetermined period, for instance a promotional period. For example, the content provider may provide a free day to view a movie as an inducement for the user to try a particular application and/or service. In other instances, content and application providers may target promotions to user devices 120 based on previous input. For example, for those users watched that watched "Hero Movie", content provider may allow those users to watch the first 30 minutes of "Villain Movie" for free, and if the user wants to continue to be free of data usage charge, then the user may be prompted to subscribe to a service provided by the content provider.

FIG. 1D illustrates a functional block diagram of a user device 120. User device 120 may be a mobile telephone uses a mobile phone operating system, such as an Android operating system (OS), mobile Linux, BlackBerry OS, etc. According to another embodiment, user device 120 may be a computer (e.g. a desktop, personal computer, laptop computer, palmtop, or tablet computer). User device 120 may include an application module 122, a data connection module 124, and a data plan client module 126. User device 120 may work in conjunction with data plan system 102 and application system 110 described above with respect to FIG. 1A. The configuration of components of user device 120 illustrated in FIG. 1D is for illustrative purposes only. Other configurations may be implemented. Therefore, user device 120 may include additional, fewer and/or different components than those depicted in FIG. 1D.

Data connection module 126 may form one or more connections to provider network 102 from user device 120, for instance through network 130. Data connection module 126 may provide passwords and other information requested by provider network 102 in order for provider network 102 to verify the identity of user device 120 and/or associated customer account. For instance, data connection module 126 may form an HTTPS connection to data plan system 104 and application server 110. One or more of the servers of data plan system 104 and/or application system 110 may be registered in a client registry for user device 120.

Data connection module 126 may register and assign communication channels for particular types of applications. For example, particular applications may be output to user device 120 using particular assigned communication channels. The communication channels and related information may be stored in table form in storage device, such as in table 170, shown in FIG. 1C.

Application module 122 may access applications for user device 120 from application server 116. For example, user device 120 may include a graphical user interface (GUI) through which a user may interact with application server 116 to request content and/or applications and to receive the content and/or applications. For instance, the user may select particular content on user device 120. Application module 122 may provide identifying information to application server 116. Application module 122 may retrieve the content for user device 120. Application server 116 may collect application information collection and store the application information in table form, for instance as represented in table 150, shown in FIG. 1B. Application module 122 may collect the application information and report the application information to application server 116. The application information may include time 152, user ID 154, app ID 156, action ID 158, content ID 160, and location 162.

Data plan client module 124 may collect data usage information regarding data usage 178 and report the data usage information to data plan server 108. The data usage information may be stored in a data usage table, for instance data usage table 170 as shown in FIG. 1C. The data usage information may include time 152, user ID 154, app ID 156, source IP 172, source port 174, data call type 176, usage 178 and bill code 180. Data plan client module 124 may output the data usage information to provider network 102, for instance data plan server 108, at periodic instances or based on requests from provider network 102.

FIG. 2 is a diagram of exemplary components of a device 200. Device 200 may correspond to user device 120, data plan system 104, or application system 110. Each of user device 120, data plan system 104, or application system 110 may include one or more devices 200. As shown in FIG. 2, device 200 may include a bus 210, a processing unit 220, a memory 230, an input device 240, an output device 250, and a communication interface 260. Bus 210 may permit communication among the components of device 200. Processing unit 220 may include any type of processor or microprocessor that interprets and executes instructions. In other implementations, processing unit 220 may be implemented as or include an application specific integrated circuit (ASIC), field programmable gate array (FPGA), or the like. Memory 230 may include a random access memory (RAM) or another type of dynamic storage device that stores information and instructions for execution by processing unit 220, a read only memory (ROM) or another type of static storage device that stores static information and instructions for processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a remote, etc. Output device 250 may include a device that outputs information to the operator, such as a display, a speaker, etc.

In an exemplary implementation, device 200 may perform operations in response to processing unit 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
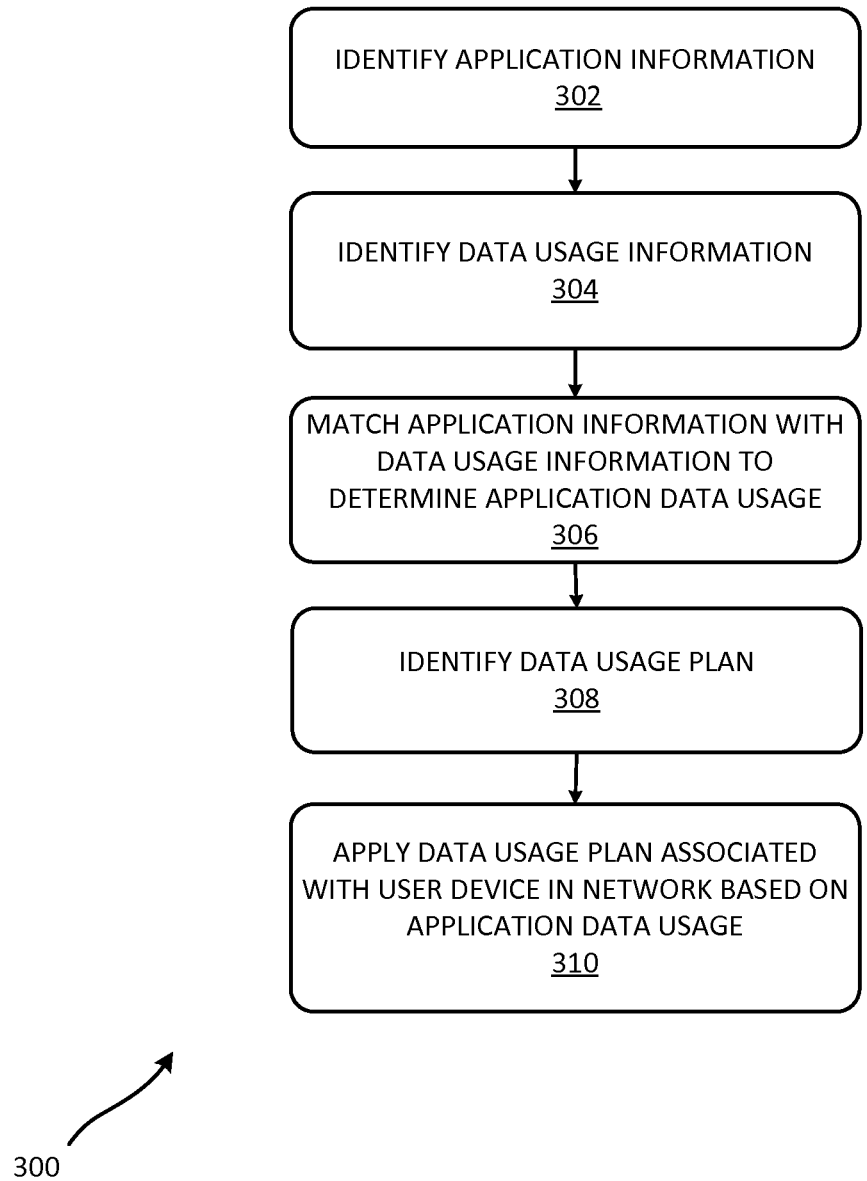
FIG. 3 is a flowchart of an exemplary process for applying a data usage plan associated with a user device in a network.

FIG. 3 is a flowchart of an exemplary process 300 for applying a data usage plan that is associated with a user device in a network 100. Exemplary application information and data usage information associated with process 300 are described in conjunction with application information table 150 in FIG. 1B and data usage table 170 in FIG. 1C, respectively. Process 300 may execute in data plan server 108. It should be apparent that the process discussed below with respect to FIG. 3 represents a generalized illustration and that other elements may be added or existing elements may be removed, modified or rearranged without departing from the scope of process 300.

At block 302, data plan server 108 may identify application information associated with user device 120. The application information may include information such as time 152, user ID 154, app ID 156, action ID 158, content ID 160, and location 162, as shown with respect to FIG. 1B and table 150. For example, data plan server 108 may receive the application information from application server 116. Application server 116 may have communicated 134 with user device 120 and received the application information from user device 120. User device 120 may have collected the application information as a user selects and inputs information requesting (and/ or using) applications (and/or content) from application server 116 as described above.

At block 304, data plan server 108 may identify data usage information for user device 120. The data usage information may include data usage information, such as time 152, user ID 154, app ID 156, source Internet IP 158, source port 160, data call type 162, usage 164 and bill code 166. For example, data plan server 108 may receive data usage information from user device 120. User device 120 may output data usage information to data plan server 108 at predefined periodic instances during times that user device 120 accesses applications and/or content from application server 116. For instance, user device 120 may perform an action regarding an application, such as browse, play, etc., that initiates data usage 178 in network 100. User device 120 may output the data usage information to data plan server 108 in real time or near real time to enable real time management of network 100 based on one or more processes initiated by data plan server 108 using the data usage plan.

At block 306, data plan server 108 may match application information for user device 120 with data usage information for user device 120. For example, data plan server 108 may identify common categories of information in the data usage information and the application information. Data plan server 108 may match a particular time 152 and user ID 154 (included in both application information table 150 and data usage table 170) with corresponding information included in application information table 150 based on the common information, such as action ID 158, content ID 160, and location 162, etc., and in data usage table 170, such as source IP 172, source port 174, data call type 176, usage 178 and bill code 180.

According to an example, data plan server 108 identifies a time 152 (e.g., 2011/06/14/19:15:20 as shown in the first row of table 150) at which an action 158 (in this instance, browse) takes place for a particular app (in this instance app ID 156 of 123) by locating an entry in the application information, in this instance application information table 150. Data plan server may identify a corresponding usage 178 (in this instance 750) and bill code 180 (in this instance 123) in data usage table 170 and thereby determine application data usage for a particular action 158 and application 156 that occurs at a same time in table 170.

At block 308, data plan server 108 may identify a data usage plan associated with user device 120. For example, data plan server 108 may access a memory or storage device (not shown) that includes one or more data usage plans for a plurality of user devices 120 and/or users. Data plan server 108 may identify a data usage plan that corresponds to the particular user device 120 and/or a user that is "signed on" to an application on user device 120.

The data usage plan associated with user device 120 may be identified with a particular device and/or a particular user that signs on to a particular application on user device 120 or directly to user device 120. The data usage plan may define terms of data usage for user device 120 and related information including billing accounts, billing rates and terms of service. Data plan server 108 may administer the data usage plan in conjunction with applications and content received by user device 120 from application server 116.

At block 310, data plan server 108 may apply the data usage plan associated with user device 120 in network 100. For example, data plan server 108 may apply the data usage plan by providing instructions for application server 116 to provide advertisements to user device 120 in response to a determination that the data usage plan requires insertion of advertisements. Data plan server 108 may interact with application server 116 and billing server 106 to put into operation different data usage plans based on application data usage and billing for different combinations of user devices 120, billing accounts, applications, advertisements, and content based different product offerings from content providers, advertisers, telecommunications network providers, and application providers.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIG. 3, the order of the blocks may be modified in other implementations. Further, non-dependent blocks may be performed in parallel. It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a telecommunications service provider providing applications to a customer, in other implementations, other types of customer-provider relationships may be supported.

Further, certain portions of the invention may be implemented as a "component" that performs one or more functions. These components may include hardware, such as a processor, an ASIC, or a FPGA, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
    receiving, by an application server device, application information associated with at least one user device;
    wherein the application information is associated with at least one application running on at least one user device in a network;
    storing, by the application server device, the received application information associated with the at least one user device;
    identifying, by the application server device, content information received by the at least one user device in association with the at least one application;
    receiving, by a data plan server device, data usage information from the at least one user device;

wherein the data usage information includes a volume of data usage by the at least one user device;

creating, by the data plan server device, data thresholds;

receiving, by the data plan server device, the identified content information from the application server device;

receiving, by the data plan server device, the application information from the application server device;

matching, by the data plan server device, the received application information, the received content information, and the received data usage information of the at least one user device with usage of the at least one application;

identifying, by the data plan server device, application data usage from the matching;

determining, by the data plan server device, that the identified application data usage exceeds a predetermined threshold;

sending a request, by the data plan server device, to implement an advertisement based usage plan to the application server device;

transmitting, by the application server device, at least one advertisement to be associated with the content information to the data plan server device;

receiving, by the data plan server device, the transmitted at least one advertisement to be associated with the content information;

determining, by the data plan server device, one or more advertisements based on the received application information, the transmitted at least one advertisement and the identified content information; and allocating, by the data plan server device, additional data usage capacity and the one or more advertisements to the at least one user device for a predetermined time based on the identified content information.

2. The computer-implemented method of claim 1, further comprising:

receiving a proposed application data usage associated with the at least one application;

determining whether the proposed application data usage is allowed under a data usage plan; and sending the proposed application data usage upon determining that the proposed application data usage is allowed under the data usage plan.

3. The computer-implemented method of claim 1, wherein receiving the application information further comprises:

receiving at least one of a user identification (ID), an application ID, an action ID, a content ID, or a location, wherein the user ID is a customer ID of a user associated with the at least one user device, the application ID identifies the at least one application, the action ID indicates a particular action associated with the at least one application, the content ID identifies content received by the at least one user device, and the location indicates a location of the at least one user device.

4. The computer-implemented method of claim 3, wherein receiving the data usage information further comprises:

receiving one or more of the user ID, the application ID, a source Internet protocol (IP), a source port, a data call type, a usage or a bill code, wherein the source IP identifies a source IP address of the data, the source port identifies a source port of the at least one application, the data call type indicates a type of data call for the at least one application, the usage indicates an amount of data used by the at least one application, and the bill code identifies a billing protocol for the data usage.

5. The computer-implemented method of claim 1, further comprising:

billing the application data usage at a first billing rate to a first billing account;

receiving additional application data usage information including additional data usage; and billing the additional application data usage using a second billing rate for a predetermined second data capacity allocation.

6. The computer-implemented method of claim 1, further comprising:

billing the application data usage for a group of users associated with a plurality of user devices to a single billing account.

7. The computer-implemented method of claim 6, further comprising:

determining whether each of the plurality of user devices has provided a same passcode that provides access to the application data usage for a particular application; and billing the application data usage incurred with the application to the single billing account in response to a determination that each of the plurality of user devices has provided the same passcode.

8. The computer-implemented method of claim 1, further comprising:

sending predetermined content to the at least one user device;

sending predetermined advertisements to the at least one user device, wherein the predetermined advertisements are provided by an advertiser having an advertiser billing account; and billing the application data usage to the advertiser billing account.

9. The computer-implemented method of claim 1, further comprising:

sending predetermined content for a predetermined period to the at least one user device, wherein the content is provided by a content provider having a content provider billing account; and billing the application data usage to the content provider billing account.

10. A device, comprising:

a memory to store a plurality of instructions; and a processor to execute the instructions that, when executed by the processor, cause the processor to perform the steps of:

receiving data usage information from at least one user device;

wherein the data usage information includes a volume of data usage by at least one user device;

creating data thresholds;

receiving content information identified from an application server device;

wherein the content information is received by the at least one user device in association with at least one application;

receiving application information from an application server device;

wherein the application information is associated with at least one application running the on at least one user device in a network;

matching the received application information, the received content information, and the received data usage information of the at least one user device with usage of the at least one application;

identifying application data usage from the matching;

determining that the identified application data usage exceeds a predetermined threshold;

sending a request to implement an advertisement based usage plan to the application server device;

receiving at least one advertisement to be associated with the content information from the application server device;

determining one or more advertisements based on the received application information, the at least one advertisement and the received content information; and allocating additional data usage capacity and the one or more advertisements to the at least one user device for a predetermined time based on the received content information.

11. The device of claim 10, wherein the processor performs the steps of:

billing the application data usage at a first billing rate and to a first billing account;

receiving additional application data usage information identifying an additional application data usage; and billing the additional application data usage using a second billing rate for a predetermined second data capacity allocation to a second billing account.

12. The device of claim 11, wherein the second billing account comprises an advertiser billing account.

13. The device of claim 10, wherein the processor perform the step of:

billing the application data usage capacity allocation for a group of users associated with a plurality of user devices to a single billing account.

14. The device of claim 13, wherein the processor perform the steps of:

determining whether each of the plurality of user devices has provided a passcode; and billing the application data usage to the single billing account in response to a determination that each of the plurality of user devices has provided the passcode.

15. The device of claim 10, wherein the processor perform the steps of:

sending predetermined content to the at least one user device;

sending predetermined advertisements to the at least one user device; wherein the predetermined advertisements are sent by an advertiser having an advertiser billing account; and billing the application data usage to the advertiser billing account.

16. The device of claim 10, wherein the processor performs the steps of:

sending predetermined content for a predetermined period to the at least one user device, wherein the content is sent by a content provider having a content provider billing account; and billing the application data usage to the content provider billing account.

17. A non-transitory computer-readable medium including instructions to be executed by a processor, the instructions including one or more instructions, when executed by the processor, for causing the processor to the operation of:

receiving data usage information from at least one user device;

wherein the data usage information includes a volume of data consumed by the at least one user device;

creating data thresholds;

receiving content information identified from an application server device;

wherein the content information is received by the at least one user device in association with at least one application;

receiving application information from an application server device;

wherein the application information is associated with the at least one application running on the at least one user device;

matching the received application information, the received content information, and the received data usage information of the at least one user device with usage of the at least one application;

identifying application data usage from the matching;

determining that the application data usage exceeds a predetermined threshold;

sending a request to implement an advertisement based usage plan to the application server device;

receiving at least one advertisement to be associated with the content information from the application server device;

receiving the at least one advertisement to be associated with content;

determining one or more advertisements based on the received application information, the at least one advertisement and the received content information; and allocating additional data usage capacity and the one or more advertisements to the at least one user device for a predetermined time based on the receive content information.

18. The non-transitory computer-readable medium of claim 17, wherein, when receiving the application information, the one or more instructions further includes instructions to perform the operation of:

receiving at least one of a user identification (ID), an application ID, an action ID, a content ID, or a location, wherein the user ID is a customer ID of a user associated with the at least one user device, the application ID identifies the at least one application, the action ID indicates a particular action associated with the at least one application, the content ID identifies content received by the at least one user device, and the location indicates a location of the at least one user device.

19. The non-transitory computer-readable medium of claim 17, wherein the one or more instructions further includes instructions, which when executed by the processor cause the processor to perform the operation of:

billing the application data usage for a group of users associated with a plurality of user devices to a single billing account.

20. The non-transitory computer-readable medium of claim 17, wherein the one or more instructions further includes instructions, which when executed by the processor cause the processor to perform the operation of:

sending predetermined content to the at least one user device;

sending predetermined advertisements to the at least one user device, wherein the predetermined advertisements are provided by an advertiser having an advertiser billing account; and billing the application data usage to the advertiser billing account.

* * * * *